INVENTOR.
ROELOF MAARTEN MARIE OBERMAN
BY
Hugh A. Kirk

April 2, 1957 R. M. M. OBERMAN 2,787,665

MATCHING REGISTER CONTROLLED CIRCUIT FOR A SWITCHING NETWORK

Filed Feb. 14, 1952 3 Sheets-Sheet 2

INVENTOR.
ROELOF MAARTEN MARIE OBERMAN
BY Hugh A. Kirk

INVENTOR.
ROELOF MAARTEN MARIE OBERMAN
BY
Hugh A. Kirk

United States Patent Office 2,787,665
Patented Apr. 2, 1957

2,787,665

MATCHING REGISTER CONTROLLED CIRCUIT FOR A SWITCHING NETWORK

Roelof Maarten Marie Oberman, The Hague, Netherlands, assignor to De Staat der Nederlanden, Ten Deze Vertegenwoordigd Door de Directeur-Generaal der Posterijen, Telegrafie en Telefonie, The Hague, Netherlands Application February 14, 1952, Serial No. 271,562

9 Claims. (Cl. 179—18)

Figure 1:
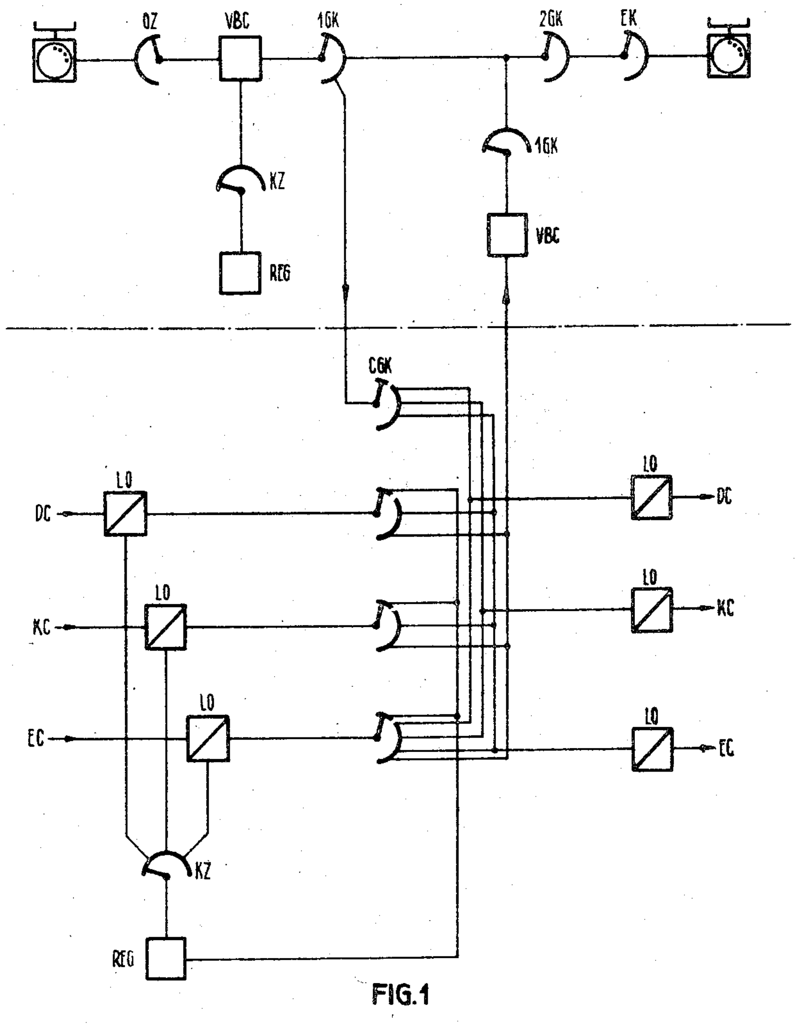

This invention relates to automatic communication switching systems controlled by register circuits. More particularly, it deals with a matching circuit providing a common register for directly-controlled automatic telephone and/or telegraph exchanges for automatic connection of these directly-controlled exchanges into a network of other exchanges containing register-controlled exchanges.

Directly-controlled automatic telephone systems have advantages for small exchanges which do not have heavy traffic problems. On the other hand as soon as traffic problems begin to play a part in a given exchange, register-controlled exchanges are to be preferred. In an automatic nation wide telephone network, it is necessary that both the small directly-controlled exchanges and the larger register-controlled exchanges be interconnected.

Accordingly, it is an object of the present invention to provide a simple, economic, effective and efficient matching control circuit which enables directly-controlled exchanges to be connected automatically in a network with register-controlled exchanges.

Another object is to provide such an automatic matching connection between directly-controlled and register-controlled exchanges in an automatic switching network, wherein special incoming circuits need not be connected to similar outgoing circuits, and wherein direct junctions need not be connected to indirect junctions or conversely.

Another object is to provide an automatic trunk selecting circuit for a directly-controlled exchange in an automatic switching network wherein it is not necessary to wait for a dial tone after dialing the first digit of a called number (indicating a free trunk has been found) before completing the dialing of the digits of that called number.

Another object of this invention is to provide a register-controlled minor or switching exchange for one or more dependent and/or subsidiary directly-controlled exchanges, which minor exchanges can convert non-register-controlled calls from the directly-controlled exchanges to register-controlled calls automatically, for selection of trunk circuits between other exchanges, thus providing a standard automatic control system for a network of different types of exchanges.

Another object is to provide such an automatic minor or switching exchange which is adaptable to any type of trunk selection system for indicating signals, such as impulses, tone codes, or the like, and which also may be connected to directly controlled exchanges according to a step by step system such as the Siemens F System.

Generally speaking, the matching circuit of this invention comprises a minor or switching exchange to which one or more directly-controlled exchanges are dependent and/or connected and to which minor exchanges the trunk circuits to other exchanges and/or group centers in a network system are connected. This minor or switching exchange provides register circuits for its dependent exchanges which do not have their own register circuits, so that such directly-controlled dependent exchanges through said minor exchange may automatically select trunk lines for connections in a network either to other directly-controlled or to register-controlled exchanges. Thus, in a network, such as on a national scale, which is composed of both heavy traffic or register-controlled exchanges and light traffic or directly-controlled exchanges, as well as intermediate traffic exchanges, all types of said exchanges can be automatically selected in the network system, regardless of whether or not register circuits are provided at their local and lowest exchange levels. It is not necessary, however, that all of the exchanges dependent on or connected to such a minor exchange be without register circuits. The number and extent of the minor exchanges in any network, of course, depends upon the location of the directly-controlled exchanges in the system which require a register supplying function.

The switching or minor exchange matching circuit of this invention comprises, as well as a register circuit, a connecting circuit. This connecting circuit comprises a rapidly operating selector switch which has two successive functions: first to find a free register for connection to the incoming calling line from a directly-controlled exchange, and then to act as a preselector for finding the trunk circuit corresponding to the first digit of the called number that is registered by said selected register. Between these two functions of the connecting circuit, means such as a rapidly operating cord finder switch in said register, may be provided for finding back and directly connecting the incoming calling line to said selected register circuit, so that the selector switch may be released for its second function under the control of said register circuit. This direct connection to said register is preferably accomplished before the second digit of the number being called has been registered; however, all of the digits of the called number must be registered before the selector switch may take up its second function as a preselector for setting up the connection through to the desired called number or subscriber, now under the control of said register. Accordingly, once this register takes control, it also may be connected in known and conventional ways as any other register to determine the charges for the call, if desired.

For calls within and between directly-controlled and/or directly connected exchanges, there is no connection made to the common register circuits of a minor exchange, since such calls do not require the selection of a trunk circuit for connection to another exchange. Therefore, the minor exchange and its matching circuit is only employed when a directly-controlled exchange as a call seeking for a connection to another exchange, which through-connection must be set-up through trunk circuits.

Furthermore, the minor or switching exchanges may also be connected to dependent exchanges having their own register circuits, instead of using one of the common register circuits provided in the minor exchange. Thus, any register-controlled exchange may be directly connected through a selector switch of the minor exchange to a desired trunk circuit under the control of its own register circuit, which operates the same as the common register circuits of the minor exchange, and which own register circuit may even be located in the minor exchange solely for that particular dependent exchange.

Figure 2:
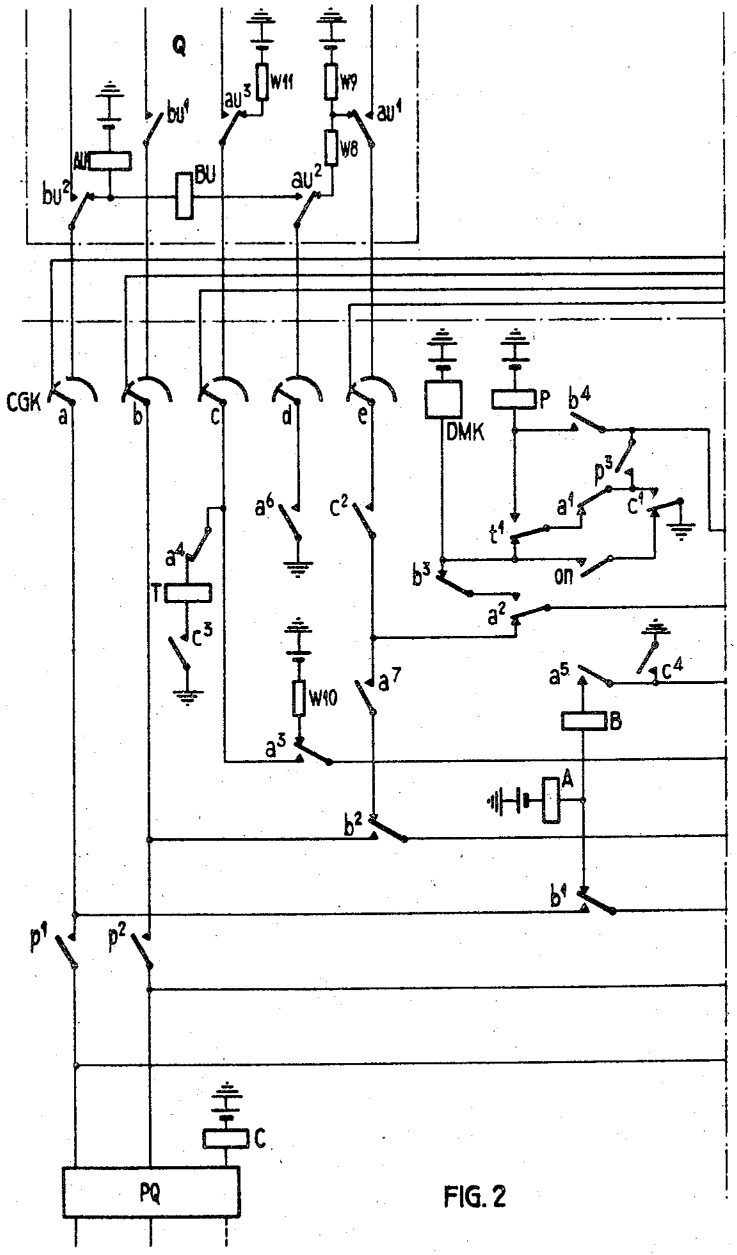
Figure 2:
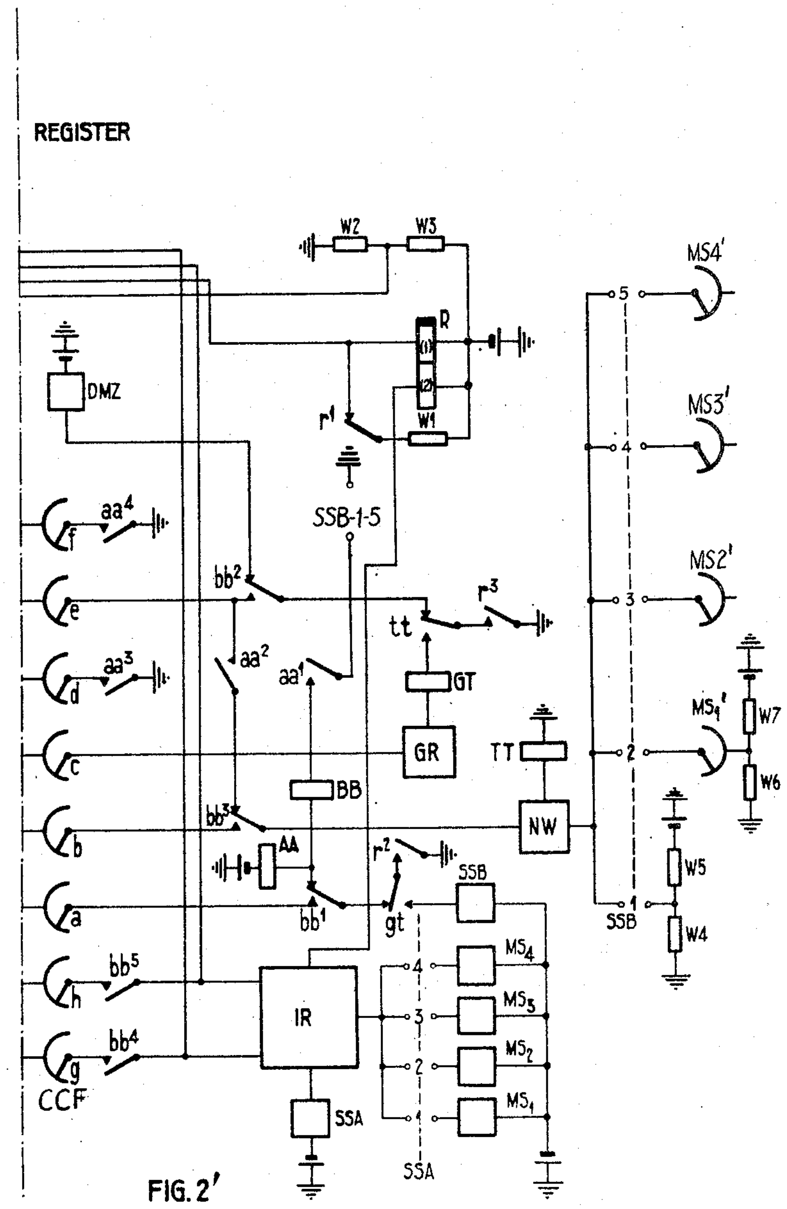

The above mentioned and other features and objects of this invention and the manner of attaining them are given more specific disclosure in the following description of an embodiment of this invention taken in conjunction with the accompanying drawings, wherein:

Fig. 1 is a schematic block wiring diagram of the trunking circuit possibilities of a minor exchange which may be connected to a register-controlled exchange, a group center and another minor exchange as well as its own dependent exchanges;

Figs. 2 and 2′ taken together show a schematic wiring diagram of just sufficient of the connections to describe the operation of the circuit of this invention from an incoming calling line from a directly-controlled exchange dependent on a minor exchange circuit as shown in dotted rectangle at the bottom of Fig. 1, to an outgoing trunk circuit from said minor exchange, including a connection circuit and its selector switch in Fig. 2 and a register circuit and its line finder switch in Fig. 2′.

I. REGISTER-CONTROLLED CALLS

Referring to Fig. 1, that portion of the trunking circuit diagram shown above the dot-dash center line 10 shows schematically how a calling subscriber S1 connected to a register-controlled exchange RE, may be connected automatically to a called subscriber S2. This is accomplished by first operating the line finder switch OZ in the register-controlled exchange which is started by a contact in the connecting circuit VBC as soon as a calling subscriber, in the case of a telephone circuit, takes his telephone from the hook. Then as the calling subscriber dials his number, the sequence of digits or impulses transmitted by the dial are registered in the register REG which may be connected to the connecting circuit VBC through a cord finder switch KZ. This cord finder KZ operates as soon as the line 11 to the calling subscriber is found, so that as soon as the digits from the calling subscriber S1 are sent to the connecting circuit VBC, they are immediately transmitted to an already connected register circuit REG. As soon as the first digit is registered in the registering circuit, the first selector switch 1GK for the called line may be set into operation to find the proper trunk circuit 12 leading to the second selector switch 2GK which is then positioned by the 2nd registered digit of the called number to find the proper trunk or line 13 to the third or final selector switch EK, which finds the exact called lines 14 in accordance with, say for example, the last two digits of the number being dialed by subscriber S1.

However, if it is desired in the network to call a subscriber belonging to an exchange that is not operated by a register but directly-controlled via one of the trunk circuits not along the horizontal line at the top of Fig. 1, the first group selector switch 1GK may be connected also to an additional or matching circuit of a switching or minor exchange ME according to this invention, which is shown connected to a plurality of different types of directly-controlled dependent exchanges below the horizontal dot-dash center line 10 shown in Fig. 1. In such a case, the first group selector switch 1GK is stepped according to the first digit of the called number to connect with the circuit 15 to the wipers of one of the group selectors 1CGK of the minor exchange ME. This selector 1CGK is then controlled according to the next or second digit registered in the register REG to select the proper circuit which connects with the desired dependent exchange such as, for example, the outgoing line repeater circuit OLR of a group center OGC, another minor exchange OME, or a local dependent exchange ODE. Although previously, the minor exchanges of this invention were stated to also have register circuits, such a register circuit is not now required for this incoming call, since the local exchange from which it originated had its own register circuit REG which controlled the connection to the trunk circuits connected to the minor selector ME. However, if desired, the register REG may physically be a part of the minor exchange circuits and just be definitely assigned only to the exchange of the subscriber S1.

II. CONVERSION OF DIRECTLY-CONTROLLED CALLS TO REGISTER-CONTROLLED CALLS

A. Minor Exchange Trunking Possibilities

On the other hand, if one of the directly-controlled exchanges IGC, IME or IDE shown connected to the minor exchange ME, wishes to connect itself with another exchange either directly-controlled or register-controlled in the network, this directly-controlled exchange must be connected with a register circuit such as register C–REG, provided in the minor exchange ME, as well as to one of the special preselectors or C-digit selectors 2CGK, 3CGK and 4CGK, provided for selecting automatically (1) first an available or free register circuit C–REG, and (2) then the trunk circuit which will connect it through to the desired other exchange.

Thus, say for example, a calling subscriber over the incoming circuit from directly-controlled dependent exchange IDE wishes to make a call to another exchange outside of his own local directly-controlled exchange, the first digit of the number being called will automatically connect it from its first group selector through its incoming line repeater ILR and through conductor 16 to the wiper of its rapidly operating C-digit selector switch 4CGK. The first contacts in the bank of switch 4CGK, say for example the first ten, over which the wiper passes, may accordingly be connected to a plurality of common register circuits C–REG, so that before the next or second digit of the number being called is dialed or sent over conductor 16, the C-digit selector 4CGK has found a free register in which said second and the remainder of the digits of the number being called can be registered. These first ten contacts of the switch CGK, or any other of the switches CGK, are available because exchanges of equal rank do not have to be connected through a switch CGK, and therefore a few spare contacts remain on these switches for special finding purposes, namely, herein for the selection of a free register C–REG. During and preferably before the register circuit C–REG has registered the second digit of the number, the register C–REG seeks to find back the incoming line IDE from which the call is coming, through a line or cord finder switch CCF, so that the remaining digits of the called number can be registered directly through conductor 17 from IDE, so the C-digit selector 4CGK can be released and prepared for its second function, namely to operate as a pre-selector under the control of the second digit of the called number now registered in register C–REG to select the proper one of the outgoing trunk circuits to the called subscriber, namely: ODE, OME, OGC or VBC′. The C-digit selectors CGK, accordingly, act as preselectors between the first normal selecting stages 1GK of the directly-controlled or register-controlled exchanges and the subsequent selecting stages in a network.

Since substantially little time is given by a directly-controlled exchange to make a connection, namely the time only for dialing the digits of the number being called, one understands why it is desirable that the C-digit selectors 2CGK, 3CGK and 4CGK are relatively fast operating so as to find and connect a free register C–REG between the time that the first and the second digit of the number is being dialed. Thus, high speed uniselectors scanning about 200 contacts per second are preferred, so that the first 10 contacts, to which the common registers C–REG are connected will be scanned within about the time for dialing one digit or within about the first 50 milliseconds of its operation. If all of the connected register circuits C–REG are occupied, then the eleventh contact of the C-digit selector may communicate automatically a busy signal to the calling subscriber, according to well known practice and connections to selector switches. All of the digits of the dialed number preferably are registered in the register C–REG, before the C-digit selector CGK can is operated as a preselector for an outgoing trunk line, because if the call is for the same exchange then the digits stored can immediately set up selectors in the local exchange without the provision of additional selectors as are required for distant exchanges.

Since all of the digits of a dialed number must be registered before the C-digit selector switch 1–4CGK can operate as a pre-selector for a trunk circuit, local exchanges which have their own registers can expedite the speed of connections by eliminating one group selector in the connection, namely the C-digit selector. However, any delay caused in passing through a minor exchange circuit is relatively immaterial because of the high speed of operation of its C-digit selectors and cord or line finder CCF.

Thus, it can be seen that for calls outside of a local directly-controlled exchange an additional digit in the called number is required for the selection of the minor exchange and operation of its C-digit selector. However, for a network system having a uniform number of digits in each number, the first digits which correspond to a called subscriber in the same directly-controlled exchange as the calling subscriber, may be automatically ignored by the first group selector in said exchange.

B. Specific Operation of a Minor Exchange

In order to explain the symbolic arrangement of the trunking diagram shown in Fig. 1, Figs. 2 and 2′ have been prepared to indicate some of the circuits which exist within the dash-line rectangle shown at the bottom of Fig. 1, and specifically indicate the function of the minor exchange circuit of this invention, as connected to a local directly-controlled exchange which does not have its own register circuit. Only those portions of the circuit which are required to explain the operation of the minor exchange of this invention are shown in Figs. 2 and 2′, the remaining portion of the circuits being shown in rectangles which are identified by reference characters in the following description.

(1) *Register selection by connection circuit*

The incoming line repeater circuit from a dependent directly controlled exchange is shown by the rectangle ILR at the lower left corner of Fig. 2, into which is connected at least a two-wire line 18, and possibly also a third wire 19 which may or may not be associated metallically with the two wires 18. As soon as a subscriber of the dependent directly-controlled exchange connected to the wires 18 wishes to make a trunk call to another exchange, indicated by the first digit of the number called which connects said subscriber to the circuit ILR (such as by dialing a "0" for example, since it is desirable to have all the lines to minor exchange on the first row of contacts of the first group selector), the signalling relay C connected to the circuit ILR operates its contacts *c*1, *c*2, *c*3 and *c*4 in the connecting circuit from their positions shown in Fig. 2.

The C-digit selector switch CGK of the connecting circuit, is preferably a motor driven selector capable of a speed of about 200 steps per second as previously mentioned, and is controlled by a control magnet DMK shown to the right of the five wipers K*a*, K*b*, K*c*, K*d* and K*e* and their arcs of contacts. This control magnet DMK is energized as soon as the signalling relay C is energized by the movement of the contact *c*1 which completes a circuit from ground, front contact *c*1, back contacts *a*1 and *t*1, control magnet DMK and battery to ground.

As previously stated, as soon as the C-digit selector CGK is started, it operates first to find a free register circuit over the first, say ten contacts of its arcs. Thus, if the K*c* wiper finds a free register circuit C–REG (Fig. 2′), a circuit is closed to the test relay T in the connecting circuit of Fig. 2. The energization of the test relay T is shown through the completed circuit from ground through the now closed front contact *c*3, relay T, back contact *a*4, K*c* wiper of selector switch CGK, wire 20 to the register circuit C–REG shown in Fig. 2′, winding 1 of relay R, and in parallel with it back contact *r*1 and resistor W1, to battery and ground. Thus, both the test relay T and the calling relay R are energized simultaneously. Upon the energization of the calling relay R, its contact *r*1 is opened so that the resistor W1 is removed from the last traced circuit, and only the high resistance of the winding of the calling relay R remains connected to the wire 20 and the corresponding contacts in the banks of the other selector switches CGK in the minor exchange. This prevents double testing of this particular register circuit and indicates its connection, selection and occupation so far as other selector switches in the minor exchange are concerned which are controlled by other incoming calls from other dependent directly-controlled exchanges.

The energization of the test relay T in the connecting circuit (Fig. 2) operates contact *t*1 to break the circuit to the control magnet DMK and stop the C-digit selector switch CGK with its wipers K*a*, K*b*, K*c* and K*e* connected to the register circuit C–REG shown in Fig. 2′. Simultaneously, the front contact *t*1 completes a circuit for the energization of a connecting relay P from ground through front contact *c*1, back contact *a*1, front contact *t*1, relay P to battery and ground. The energization of connecting relay P closes the contacts *p*1 and *p*2 in the incoming wires *a* and *b* from circuit ILR and wires 18, to connect them directly to the wipers K*a* and K*b* of the C-digit selector CGK, and thence through the wires 21 and 22 to the impulse receiver IR of the register circuit in Fig. 2′. Thus, the next or second and following digits of the number being called from the local directly-controlled exchange over wires *a* and *b*, may be directly registered in the impulse receiver IR of the just selected register circuit C–REG.

As these, herein four, digits of the called subscriber are received by the circuit IR, the incoming sequence switch SSA connected thereto, operates successively for each of said four digits, its contacts 1, 2, 3 and 4, connecting the marking or marker switches MS1, MS2, MS3 and MS4 to battery. Since the type of impulse transmission and registering system is immaterial to this invention, these circuits are represented as squares in Fig. 2′. As soon as all the digits of the called number have been recorded, respectively, on their corresponding marker switches MS1 through MS4, this register circuit C–REG will be ready to control the connection of the proper trunks and the lines through the whole network to the final called subscriber's station, provided of course the C-digit selector (in Fig. 2) has been released and is ready to act as a trunk preselector switch.

(2) *Release and by-pass of connection circuit*

Immediately after the register C–REG in Fig. 2′ has been seized through the wire 20, and simultaneously with the operation of the relay T in Fig. 2, contact *r*3 of the calling relay R in the register C–REG is closed, completing a circuit from ground through front contact *r*3, back contact *tt*, back contact *bb*2 to the control magnet DMZ for the line or cord finder CCF which is then operated to find back the wires *a* and *b* which have just been connected to this register C–REG and by-pass the C-digit selector CGK so it can be re-set for performing its next and second trunk selector function.

Simultaneously with the energization of the control magnet DMZ for the cord finder CCF by the closing of the contact *r*3, contact *r*2 is also closed, which energizes the relay AA in register C–REG (Fig. 2′) from ground through front contact *r*2, back contact *gt*, back contact *bb*1, relay AA to battery and ground. This relay AA closes its contact *aa*2 to the wiper F*e* of the cord finder CCF, so that a circuit may be completed to find back said *a* and *b* wires from the register C–REG through the connecting circuit and back again to said register C–REG. Relay AA also closes its contact *aa*1 to shunt out relay BB and prevent its energization with relay AA at this time by connecting ground to both sides of the relay BB in a circuit from ground, closed outgoing sequence switch contacts SSB–1–5, front contacts *aa*1, relay BB, back contacts *bb*1 and *gt*, front contacts *r*2 and again to ground.

This detection or finding back of the seized register C–REG may be accomplished by means of a D. C.

voltage comparison device NW which compares one voltage, such as from a potentiometer of resistances W2 and W3, shown at the top center of Fig. 2′ in the now seized register C–REG, with the same voltage from another potentiometer of resistances W4 and W5, shown to the lower right in Fig. 2′ in said same register circuit. The voltage from the potentiometer W2/W3 thus is connected through the line 23 (Fig. 2′), fixed wiper K*e* of the C-digit selector CGK in Fig. 2, closed contact *c*2, back contact *a*2, wire 24, now searching wiper F*e* of the cord finder CCF in register C–REG (Fig. 2′), front contact *aa*2, back contact *bb*3, electronic or voltage comparison device NW, and initially normally closed contacts SSB1 to potentiometer W4/W5.

Contact SSB1 is controlled by a second or outgoing sequence switch SSB which may not be operated until after a second test of the found back circuit is made, such as by the second testing device GR which operates test relay GT. This outgoing sequence switch SSB thus is in its first position closing contacts SSB1 when the register C–REG is seized; then after each time a received and stored digit of the called subscriber's number has been used from the register circuit C–REG for setting up a connecting switching stage, the outgoing sequence switch SSB is stepped to its next position opening the former or previous contacts and closing its next contact in succession, namely, contacts SSB2, SSB3, SSB4 and SSB5. After all of the digits stored in the register circuit C–REG have been used in setting up the connection, the outgoing sequence switch SSB steps to its sixth position to open its contacts SSB1–5 in the circuits to relays AA and BB to release these relays and the whole register circuit C–REG before stepping again to its initial or first position closing again contacts SSB1 and SSB1–5.

Accordingly, as soon as the wiper F*e* of the cord finder CCF, described later, meets a contact which has the same voltage as applied to it from the potentiometer W4/W5 through the previously described circuit to the potentiometer W2/W3, the electronic comparator NW is operated to make this first test of the connection and to energize the register testing relay TT. The operation of this relay TT operates its contact *tt* breaking the circuit to the control magnet DMZ for the cord finder CCF, stopping the cord finder CCF, which now remains deenergized until the function of the register C–REG is completed which is insured by the operation of contacts *bb*2 described later.

The operation of the register relay TT, also through its contacts *tt* may and herein does connect a second testing device GR, completing a circuit from ground, through closed contact *r*3, test relay GT mentioned above, the second D. C. voltage testing device GR, wiper F*c* of the cord finder CCF, wire 25 (Fig. 2), back contact *a*3, resistance W10 to battery and ground.

If this test proves correct, which it should by measuring the value of resistance W10 in circuit GR, the relay GT is energized to move contact *gt* which connects the outgoing sequence switch SSB from ground through front contacts *r*2 and *gt*, switch SSB to battery and ground causing switch SSB to move to its second position and close its second contact SSB2 which connects the first electronic comparison device NW to another potentiometer of resistances W6 and W7, which has been selected according to the first marker switch MS1. Thus the outgoing sequence switch SSB steps each time another digit of the called subscriber's number has been used to set a corresponding selecting switching stage. The operation of the contact *gt* also removes the shunt through ground to the relay BB of the register C–REG, so that relay BB now is energized in series with the relay AA through the circuit from ground, battery, relay AA, relay BB, front contact *aa*1 to ground. Thus, the relays AA and BB hold themselves energized throughout the remaining part of the operation of the register C–REG, namely as long as the sequence switch SSB remains in one of its first five positions SSB1–5, or until the sequence switch SSB moves into its sixth position and the register circuit is at rest. If desired, however, the second extra D. C. testing device GR and its relay GT may be omitted from the register circuit C–REG without departing from the scope of this invention, by controlling its functions directly from the first testing device NW and its relay TT.

The energization of relay BB also directly connects lines *a* and *b* of the incoming dependent exchange circuit of Fig. 2, directly to the impulse receiver IR through wires 31 and 32, wipers F*g* and F*h* of the cord finder CCF and front contacts *bb*4 and *bb*5, respectively; thus, by-passing the complete connecting circuit of Fig. 2 including the C-digit selector CGK so selector CGK may be released for its next and second or trunk pre-selector function. This release is caused by the operation of contact *bb*3 of the relay BB, which breaks the circuit to the first testing device or electronic comparator NW. This correspondingly deenergizes the relay TT which returns its contact *tt* to the position shown in Fig. 2′, breaking the circuit to the second testing device GR and deenergizing its relay GT, so that its contact *gt* is also returned again to the position shown in Fig. 2′. The operation of contacts *bb*2 now prevents further operation of the stepping magnet DMZ for the cord finding switch CCF during the operation of this register circuit C–REG, and also connects ground through front contact *r*3, back contact *tt*, front contact *bb*2, wiper F*e* of cord finder switch CCF to the wire 24 to prepare for the reenergization of the stepping magnet DMK (Fig. 2) for the second operation of the selector switch CGK as a trunk line finder switch.

Since the relay R must remain energized throughout the connection or operation of the register C–REG, the relay R is provided with a second coil or winding (2) which is energized through a guard relay (not shown) in the circuit IR when the connection is completed to the wires 31 and 32 by the closing of contacts *bb*4 and *bb*5 that connect the circuit IR directly to the incoming calling lines *a* and *b* in Fig. 2. Relay R is also a relay which is delayed in releasing so that if any time elapses between the disconnection of winding (1) by the movement of the selector switch CGK and the energization of the winding (2) by the closing of contacts *bb*4 and *bb*5, the contacts of the relay R will remain operated. Thus between the windings (1) and (2) of relay R the contacts operated by the relay R remain operated as long as the register circuit C–REG is connected to control the setting up of a connection in the system.

The operation of the relay BB also operates the contact *bb*1 which now connects ground through front contact *r*2, back contact *gt*, front contact *bb*1, wiper F*a* of cord finder CCF, wire 34 (Fig. 2), back contact *b*1, relay A to battery and ground. This circuit energizes relay A which breaks the circuit to the connecting relay P by opening contact *a*1, so that both contacts *p*1 and *p*2 in incoming lines *a* and *b* are opened removing the connecting circuit from wires *a* and *b* which already have been by-passed and directly connected to the impulse receiver IR directly through wires 31 and 32 so that all digit impulses regardless of when received will be immediately communicated to and registered in the register C–REG.

(3) *Connection circuit for trunk selection*

The operation of the relay A (Fig. 2) operates its contact *a*2 which again connects the control magnet DMK so the C-digit selector switch CGK may again be energized to start searching for the proper trunk circuit corresponding to the first digit registered in the register C–REG shown in the circuit in Fig. 2′. This circuit for the re-energization of the control magnet DMK in Fig. 2, is from the ground to battery, control magnet DMK, back contact *b*3, front contact *a*2, line 24 (Fig. 2′), wiper F*e* of the cord finder CCF in the register C-REG, front contact *bb*2, back contact *tt*, and front contact *r*3 to ground. Accordingly the C-digit selector CGK is started again to sweep over the remaining contacts of its banks of contacts, to find the proper trunk circuit from the minor exchange of this invention corresponding to the connection made by the first marker switch arc MS1′, which may be by voltage comparison with the potentiometer of resistances W6 and W7, shown in the register C-REG and previously mentioned above which was connected upon the operation of the outgoing sequence switch SBB, when second test relay GT was energized and the contact SSB2 was closed and contact SSB1 was opened. Now a second comparison circuit is set up to the first testing device NW for a voltage corresponding to that from the potentiometer W6/W7 now connected to device NW. This comparison circuit is from potentiometer W6/W7, through contact arc MS1′ of marker switch MS1, closed contact SSB2, comparator device NW, front contact *bb*3, stationary wiper F*b* of cord finder CCF, line 33 (Fig. 2), back contact *b*2, front contact *a*7 and *c*2, searching wiper K*e* of C-digit selector switch CGK, until it finds wire 41 to a line repeater of the desired trunk circuit OLR, back contact *au*1 to potentiometer of resistances W8 and W9 producing the same voltage as potentiometer W6/W7. When this same voltage is found the testing device NW is operated to energize relay TT which operates its contact *tt* to break the circuit to control magnet DMK for the second and last time, stopping the motion of C-digit selector switch CGK with its wiper K*e* connected to wire 41.

The operation of contact *tt* also connects the second testing device GR and its relay GT to the found trunking circuit OLR, through a circuit now completed from ground (Fig. 2′), front contacts *r*3 and *tt*, relay GT, testing device GR, stationary wiper F*c* of cord finder CCF, wire 25 (Fig. 2), front contact *a*3, now stationary wiper K*c* of C-digit selector CGK (testing relay T having been disconnected previously by operation of relay A and its contact *a*4), wire 42 to circuit OLR, back contact *au*3, resistance W11 to battery and ground. Now that this second test circuit is completed, the relay GT is again energized to operate its contact *gt* for breaking the circuit through wiper F*a* of the cord finder CCF in the register C-REG, thereby removing the ground shunt across the relay B in the connecting circuit in Fig. 2 (namely, from ground, through contacts *r*2, *gt*, *bb*1, wiper F*a*, wire 34, contact *b*1, relay B, contacts *a*5 and *c*4 or wire 35, wiper F*d* and contacts *aa*3 back to ground), so that relays A and B are now being energized in series through the following circuits: from ground to battery, relay A, relay B, front contact *a*5, and either front contact *c*4 to ground, or parallel there to wire 35 (Fig. 2′) wiper F*d* of cord finder CCF and front contact *aa*3 to ground.

The operation of relay B and its contact *b*1 closes a circuit from ground in register C-REG through wiper K*a* of selector switch CGK, wire 51 and contact *bu*2 to energized relay AU in circuit OLR which operates its contact *au*1 in OLR to break the testing circuits and prepare relay BU for energization, similar to the operation of relays AA and BB, and A and B above described. Contact *b*2 connects the testing device NW for testing the next circuit to be found beyond circuit OLR through wiper K*b* of switch CGK, wire 52 and contact *bu*1 under the control of the next digit registered in the register. Contact *b*3 breaks again the circuit to the control magnet DMK so further testing of subsequent register connected circuits will not later energize DMK a third time, so that C-digit selector switch CGK cannot be operated again as long as this register circuit C-REG is connected to this circuit. The closure of contact *b*4 completes a circuit for the energization of the relay P again, from ground (Fig. 2) to battery, relay P, front contact *b*4, wire 36, stationary wiper F*f* of cord finder CCF, front contact *aa*4, to ground. Relay P now directly connects again wires *a* and *b* to the circuit OLR through front contacts *p*1 and *p*2, the wipers K*a* and K*b* of selector CGK and wires 51 and 52.

As each test is made, the second or outgoing sequence switch SSB steps to its next position to close its contact for the connection of the contact arc MS2′, MS3′ and MS4′ successively to separate voltage levels (similar to those from the potentiometers W4–W5 and W6–W7) which correspond to the remaining digits of the called number. These voltages are successively applied to the testing circuit NW and then through the wires 34 and 41 and front contacts *au*1 to set other selector switches, such as switch 1GK′, 2GK and EK shown in Fig. 1. Then after the last or final selector EK is positioned, the outgoing selector switch SSB is stepped into its sixth position to release the whole register circuit C-REG.

Also as each test is made, the second test relay GT will be energized to remove the ground from a corresponding relay B in a following circuit, so that it may energize in series with its corresponding relay A, and remain so energized until the circuit is completed and calling relay C in Fig. 2 is deenergized, which will then deenergize all relays A and B (via contact *c*4), AU and BU (via contact *a*6), and other A and B relays of the connections (via similar contacts). When this occurs, the contacts of the relay C return to their positions shown in Fig. 2 and contact *c*1 may connect ground through a contact "on" to the stepping magnet DMK so that its corresponding selector switch CGK may be moved to a home position when the contact or switch "on" is operated.

Accordingly, in view of the previous description of a specific circuit, it can be seen how by ordinary dialing methods a calling subscriber in a local directly-controlled exchange can be automatically connected to any other subscriber in another exchange in a network system of both directly-controlled and register-controlled exchanges without the use of special digits and codes and waiting for trunk connections between the digits being dialed. This is accomplished by means of intermediate or minor exchanges to which all directly-controlled exchanges are dependent, which sole function is to convert quickly and automatically, within the time two consecutive digits are being dialed or used, the directly-controlled calls to register-controlled calls.

While there is described above the principles of this invention in connection with specific apparatus, it is to be clearly understood that this description is made only by way of example and not as a limitation to the scope of this invention.

What is claimed is:

1. In an automatic switching network comprising a plurality of exchanges some of which are directly controlled and some of which are register controlled, the improvement comprising: a switching exchange connected to a plurality of dependent exchanges at least one of which dependent exchanges is a directly controlled exchange, said switching exchange comprising; a connecting circuit and a register circuit for the use of said directly controlled dependent exchanges when calling another exchange, said connecting circuit comprising a group selector switch having two successive sets of outgoing contacts, the first set being connected to select a free said register circuit and the second set being connected to select a connection under the control of said selected register circuit, means controlled by the initiation of a call from one of said directly controlled exchanges to another exchange to operate said group selector switch over said first set of contacts to select and operate said register circuit, and means controlled by said selected register circuit to operate said group selector switch over said second set of contacts, whereby said call from any of said dependent directly controlled exchanges to another exchange may be converted automatically into a register controlled call for automatic connection through said network.

2. In a network according to claim 1 wherein said selected register circuit includes: a finder switch for finding back said connecting circuit to provide a second connection to said selected register that by-passes the connection through said group selector switch so as to permit said group selector switch to operate over its said second set of contacts, and means controlled by said selected register circuit for operating said finder switch.

3. In a network according to claim 1 wherein said two sets of contacts are in the same level of said group selector switch.

4. An automatic switching system network comprising a plurality of directly controlled exchanges and a plurality of register controlled exchanges, the improvement comprising: at least one switching exchange to which said directly controlled exchanges are connected and dependent, said switching exchange being connected to said register controlled exchanges by trunk circuits, said switching exchanges comprising: a connecting circuit to connect said trunk circuits from said register controlled exchanges through said dependent exchanges, register circuits for use of the dependent directly controlled exchanges when calling another exchange, said connecting circuits comprising a selector switch having two groups of successive outgoing contacts, the first group of outgoing contacts being connected to select a free one of said register circuits and the second group of outgoing contacts being connected to select the desired trunk circuit from said switching exchange under the control of said selected free register, means controlled by the initiation of a call from one of said dependent directly controlled exchanges to another exchange to operate said group selector switch over said first set of contacts to select and operate said selected register circuit, and means controlled by said selected register circuit to operate said group selector switch over said second set of contacts, whereby said dependent exchanges are automotically provided with register circuits for controlling connections through said trunk circuits to other exchanges.

5. A network according to claim 4 wherein said register circuit includes a finder switch to find back said connecting circuit and by-pass said selector switch whereby it may be released for moving to its said second group of outgoing contacts, and means controlled by said selected register circuit for operating said finder switch.

6. A network according to claim 5 wherein said register circuit includes means for doubly testing each connection made by said selector switch and said finder switch.

7. A network according to claim 5 wherein said connecting circuit includes means controlled by said register circuit for releasing said selector switch as soon as it has been by-passed, and means for starting said selector switch to move over its said second group of contacts.

8. In an automatic switching system network of both register controlled and directly controlled exchanges, the improvement comprising: the addition of at least one switching exchange to said network to which all said directly controlled exchanges are dependently connected, and to which switching exchange trunk circuits are connected to all said register controlled exchanges; said switching exchange comprising: a connecting circuit and a register circuit for use of a dependent exchange when calling another exchange, said connecting circuit having a rapidly operating selector switch, means for first operating said selector switch to select a free said register circuit in response to an incoming call from a directly controlled exchange to another exchange and to operate said selected register circuit, a dependent exchange means operated by said selected register circuit to establish another connection from said incoming call to said selected register circuit to by-pass the first connection so that said selector switch can be released, and means to reconnect said selector switch to said selected register circuit under the control of said selected register circuit and then to operate said selector switch as a preselector for a called outgoing one of said trunk circuits.

9. A system according to claim 8 wherein said means to establish said other connection comprises a finder switch in said register circuit.

References Cited in the file of this patent

UNITED STATES PATENTS

| | | |
|---|---|---|
| 1,821,998 | Wright | Sept. 8, 1931 |
| 2,467,490 | McClew et al. | Apr. 19, 1949 |
| 2,529,166 | Lesigne | Nov. 7, 1950 |